United States Patent [19]
Harper et al.

[11] Patent Number: 5,832,507
[45] Date of Patent: Nov. 3, 1998

[54] METHOD AND APPARATUS FOR CONVERTING ASCII PATH NAMES TO PARSED PATH NAME STRUCTURES

[75] Inventors: James M. Harper; Brian Berliner, both of Colorado Springs, Colo.

[73] Assignee: Sun Microsystems, Inc., Palo Alto, Calif.

[21] Appl. No.: 626,716

[22] Filed: Apr. 1, 1996

[51] Int. Cl.⁶ ..................... G06F 17/30
[52] U.S. Cl. ............ 707/200; 707/103; 395/500
[58] Field of Search .................. 395/616, 617, 395/500; 707/103, 200

[56] References Cited

U.S. PATENT DOCUMENTS

| | | | |
|---|---|---|---|
| 5,375,204 | 12/1994 | Motoyama et al. | 707/164 |
| 5,412,808 | 5/1995 | Bauer | 707/600 |
| 5,437,029 | 7/1995 | Sinha | 707/600 |
| 5,444,445 | 8/1995 | Chu | 341/87 |
| 5,454,046 | 9/1995 | Carman, II | 382/166 |
| 5,463,774 | 10/1995 | Jenness | 707/600 |
| 5,475,804 | 12/1995 | Bennett | 707/139 |
| 5,568,639 | 10/1996 | Wilcox et al. | 707/600 |
| 5,579,517 | 11/1996 | Reynolds et al. | 707/616 |

FOREIGN PATENT DOCUMENTS

| | | | |
|---|---|---|---|
| 588 488 A | 5/1997 | European Pat. Off. | G06F 17/30 |

OTHER PUBLICATIONS

Wang "Universal File Names for Ada" ADA Letters, vol. 10, No.1, pp. 111–117, Jan. 1990.

Davis et al. "Unicode" 1990 IEEE International Conference on Systems, Man and Cybernetics—Conference Proceedings, pp. 499–504, Nov. 1990.

"File Name Mapping in a Heterogeneous Distributed Environment" IBM Technical Disclosure Bulletin, vol. 32, No. 10a, pp. 456–462, Mar. 1990.

Langer et al., "Internationalization using Standard C++" C/C++ Users Journal, n9, p57(9), Sep. 1997.

Rex Jaeschke "Internationalization: a primer, part 2" C/C++ Users Journal, v13, n10 p69(9) Oct., 1995.

Rex Jaeschke "Interationalization: a primer" C/C++ Users Journal, v13, n9, p67(10), Sep. 1995.

Kano et al. "Internationalizing you Win32–based applications for Windows NT and Windows 95" Microsoft Systems Journal, v9, n12, p. 49(11), Dec. 1994.

William S. Hall "Internationalization in Windows NT, part II: locales, languages, and resources" Microsoft Systems Journal, v9, n7, p. 55(18), Jul. 1994.

Charles Petzold "Move over ASCII, Unicode is here" PC Magazine, v12, n18, p. 374(3), Oct. 1993.

*Primary Examiner*—Thomas G. Black
*Assistant Examiner*—Michael J. Wallace, Jr.
*Attorney, Agent, or Firm*—William J. Kubida; Francis A. Sirr; Holland & Hart LLP

[57] ABSTRACT

A method and apparatus for converting ASCII path names to parsed path name structures provides downward compatibility so that program modules written for modern operating systems which provide parsed path name structure inputs may be run under older operating systems which provide ASCII path name inputs. The method includes, in its most basic form, the steps of converting the prefix and file name of an ASCII path name to a unicode string, then converting the unicode string to a parsed path structure. In a preferred embodiment of the invention, the method is implemented in compiled object code written in the "C" computer programming language. The object code defines a parsed path structure, allocates buffers for stack variables, creates various pointers for scanning and counting functions, determines whether or not Uniform Naming Convention is used for the ASCII path name, converts the ASCII code to a unicode string, and then via scanning and counting, converts the first two character spaces in the unicode string to unicode numbers which indicate total string length and prefix length, respectively, and converts every other backslash character within the unicode string to a unicode number which identifies the length of the name component of the string which follows that particular number.

17 Claims, 3 Drawing Sheets

METHOD AND APPARATUS FOR CONVERTING ASCII PATH NAMES TO PARSED PATH NAME STRUCTURES

BACKGROUND OF THE INVENTION

1. Field of the Invention:

This invention relates to methods and apparatus for converting a string of formatted computer readable characters to a new string having a new format.

2. Description of Related Art:

The move in the microcomputer industry from the Microsoft® Windows™ version 3.X graphic environment, which runs under the 8/16-bit MS-DOS operating system, to the 32-bit Microsoft Windows 95 operating system has created a number of problems. Although Windows 95 has been designed so that it will run most software written for Windows ver. 3.X, programs which are written to take full advantage of the expanded capabilities of Windows 95 are often incompatible with Windows ver. 3.X.

One of the incompatibilities between the old and new versions of Windows relates to path names. A path name is a unique identifier assigned to each file in a distributed data processing system. A path name, as it appears to the end user, has a similar format under both Windows ver. 3.X and Windows 95. The path name for any file always beings with a host identifier and ends with a file name. For example, "C:\WINDOWS\SYS\FILE.EXE" and "\\HOST\J\WINDOWS\SYS\FILE.EXE" are path names representative of those used with Windows ver 3.1. The first example does not follow the Uniform Naming Convention (UNC); the second example does. Directories, subdirectories and file names are limited to eight characters plus a three character extension. Generally, however, it is customary to use three character extensions for only file names. The UNC path name contains a host designator "host" and a shared designator "J". It will be noted that the UNC path name begins with double backslash characters, and that no colon character is used in the UNC name.

Windows ver. 3.X uses American Standard Code for Information Interchange (ASCII for short). As each ASCII character is represented by a single byte (eight bits), 256 characters are the maximum that may be represented by the ASCII character set. Given the substantial decreases in the cost of both semiconductor and rotating magnetic storage memory, it is not surprising that ASCII code is being supplanted by a new, less-efficient but more capable code based on two-byte characters. The new code, called unicode, can distinguish between 65,536 characters, a quantity sufficient to encompass all foreign alphabets and the Chinese/Kanji characters.

A path name under Windows ver. 3.X is stored as it appears on a computer screen. That is to say that, in the case of a UNC path name, it is stored as a string of ASCII characters which begins with the double backslash ("\\") and ends with the file name. The elements of the path name (e.g. host, shared, directory, subdirectories, and file name) are separated from one another by a single backslash ("\"). The string is terminated by a null byte (i.e. one which is set to 00HEX). A non-UNC path name is stored beginning with a letter for the drive designator and ends with the file name.

A path name under Windows 95, on the other hand, is stored as a specially formatted unicode string known as parsed path name structure. Such a structure omits both the host name and the shared name in the case of a UNC name, or the drive designator in the case of a non-UNC path name, and has the following format: The first unicode value, or byte pair, specifies the total length of the parsed path name structure in bytes; the second unicode value indicates the length, in bytes, of the prefix (in this case, the prefix begins with the first unicode value of the string, and includes the directory and all subdirectories up to, but not including, the file name); the third byte pair indicates the length, in bytes, of the first path element in the prefix after the shared drive specifier or initial drive specifier (in the case of a non-UNC name), including the backslash character with which it begins; the third byte pair is followed by an array of unicode values corresponding to the characters in the name of the first path element; the first path element name array is followed by a subsequent byte pair which indicates the length, in bytes, of a second path element (if any); other subsequent byte length indicators and unicode arrays may follow, depending on the number of subdirectories which precede the file name; the final path element is the file name, and it, like other path element, is preceded by a byte length indicator.

The need for the present invention arose during the development by Sun Microsystems, Inc. of a caching program module which would operate under both Windows 95 and Windows ver. 3.1 in a networked environment which may include modem connections. The module was initially written to operate with Windows 95. As such, it expected inputs, such as parsed path name structures, which are peculiar to Windows 95. If the program were to be run in a Windows ver. 3.X environment, the zero-terminated path names characteristic of Windows ver. 3.X would require conversion to the parsed path name structures.

SUMMARY OF THE INVENTION

In accordance with this invention, the above problem has been solved by the development of an efficient method implemented in conjunction with a computing system for converting a zero-terminated ASCII path name to a parsed path name structure. In a particular embodiment disclosed herein, the method includes the steps of:

(a) loading a first buffer with an ASCII path name;

(b) determining whether or not the path name conforms to the Uniform Naming Convention (UNC) and contains both a host name and a shared name prior to the prefix;

(c) establishing a second buffer within which a parsed path name structure corresponding to the ASCII path name will be assembled;

(d) sequentially scanning the ASCII path name character by character, beginning with either the first character of the ASCII path name for a non-UNC name, or with the backslash character preceding he first path element of the prefix, if a UNC name;

(e) converting each character of the ASCII path name as it is scanned to a unicode character value;

(f) sequentially writing each unicode character value to the second buffer as the conversion proceeds to create a string of unicode character values having first and last unicode characters, and leaving two extra, or dummy, characters at the beginning of the second buffer for UNC names, but none for non-UNC names;

(g) appending a null unicode character value to the second buffer immediately following said the last unicode value of the unicode string;

(h) determining a quantity 2T equivalent to the total length, in bytes, of said unicode character string;

(i) determining a quantity 2P equivalent to the length of the prefix in bytes, and placing a unicode character corresponding to the quantity 2P in a second character space within the buffer; and (j) converting each unicode value corresponding to a backslash character within said unicode string to a specific unicode values, each of which identifies a length, in bytes, associated with a path element which began with the replaced backslash character unicode value.replacing a backslash character which precedes each name with a corresponding length quantity.

The above computer implemented steps in another implementation of the invention are provided as an article of manufacture, i.e., a computer storage medium containing a computer program of instructions for performing the above described steps.

The great advantage and utility of the present invention is the efficient conversion of ASCII path names to parsed path name structures. The invention permits program modules designed to run under operating systems that provide parsed path name structure inputs to run under other operating systems which provide only ASCII path name inputs.

The foregoing and other features, utilities and advantages of the invention will be apparent from the following more particular description of a preferred embodiment of the invention as illustrated in the accompanying object code listing and in the drawings.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
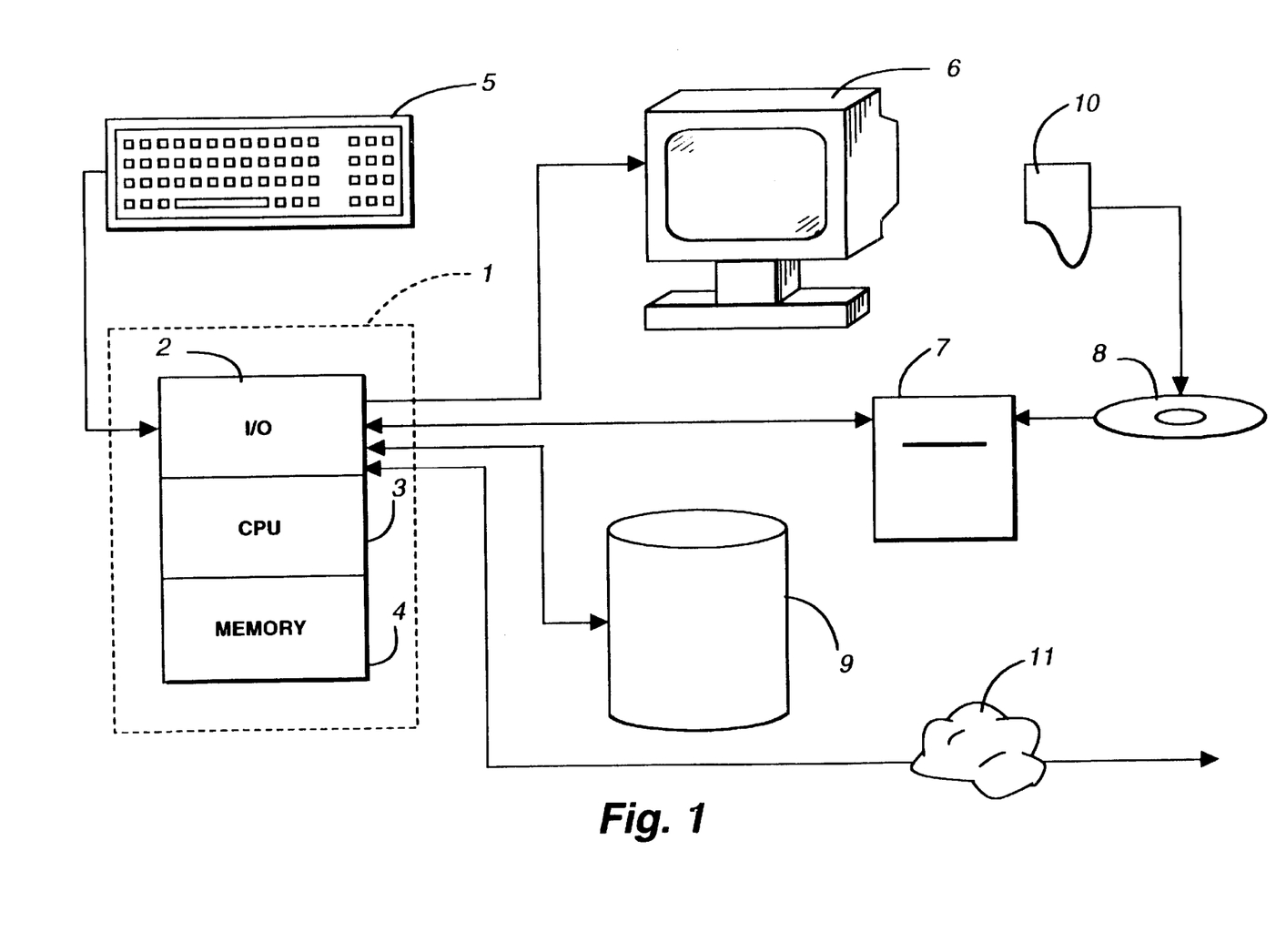
FIG. 1 illustrates a representational computing system and operating environment for performing the computer implemented steps of the method in accordance with the invention.

The operating environment in which the present invention is used encompasses the general distributed computing system, wherein general purpose computers, workstations, or personal computers are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM 8 of such a system. Examples of such systems include SPARC® systems offered by Sun MicroSystems, Inc., personal computers offered by IBM Corporation and by other manufacturers of IBM-compatible personal computers, and systems running the UNIX® operating system.

As a starting point for describing the invention, an object code listing of a computer program which implements the method is provided. The program, written in C code, is considered to be a preferred implementation of the method. Although other high-level languages might be used to implement the method, C is considered to be particularly well-suited, as large portions of Windows ver. 3.X and Windows 95 are believed to have been written in C.

---

Conversion Routine in C

---

```
typedef ParsedPath *path_t;
typedef unsigned short *string_t;
struct PathElement {
    unsigned short pe_length;
    unsigned short pe_unichars[1];
}; /*Path Element */
struct ParsedPath {
    unsigned short pp_totalLength;
    unsigned short pp_prefixLength;
    struct PathElement pp_elements[1]
}; /* ParsedPath */
//Fromn sunwifs.c
//NameJam - converts ASCII pathname into unicode/path struct
INT
NameJam(PPCHAR pPathName,
    PCRS pcrs,
    path_t *pppath,
    string_t *puFName,
    string_t *pupath)
    INT Len;
    USHORT chCount;
    string_t UniBuf;
    string_t UniPath;
    string_t pUniEnd;
    string_t pUni;
    string_t uFName;
    PUCHAR pStr;
    PUCHAR PathName = *ppathName;
    UNIT DriveNo;
    *pPathName = (PCHAR)LowBuf;
    PathName = LowBus;
    if (pupath) {
        pUniEnd = UniBus = *pupath;
        //Convert the ASCII pathname to unicode
        for (pStr = PathName; *pstr;
            *pUniEnd++ = *pStr++;
        *pUniEnd-- = '\0';
    // Fing last '\' for uFName
    for (uFName = pUniEnd; *uFName != '\\'; uFName--)
        ;
    // And point to the next character
    uFName++;
    *puFName = uFName;
}
// if UNC, only convert after the share name
if (PathName[0] == '\\' && PathName[1] == '\\') {    //UNC
    // first, advance to beginning of share name
    PathName = strchr(&PathName[2], '\\');
    // then, advance to beginning of pathname after share name
    if (PathName)
        PathName = strchr(PathName+1, '\\');
        if (PathName == NULL) {
            return (-1);
        }
```

-continued

Conversion Routine in C

```
    // move back 2 characters to hold ParsedPath structure
    PathName -= 2;
Len = strlen(PathName);
pUniEnd = UniPath = (string_t) *pppath;
// Convert the ASCII pathname to unicode . . .
for (pStr = PathName; *pStr; )
        *pUniEnd++ = *pstr++;
*pUniEnd-- = '\0';
// Find last '\' for pp prefixLength
for (pUni = pUniEnd; *pUni != '\\'; pUni--)
UniPath[1] = (pUni - UniPath) *2;       //pp_prefixLength
UniPath[0] = 2 * Len;      //pp_totalLength (w/o trailing null)
/** Now back up, counting characters, replacing the '\' with the
    * count (i.e., setting pe_length) */
for (chCount = 0; pUniEnd >= &Unipath[2]1 pUniEnd--)
        if (*pUniEnd == '\\' {
            *pUniEnd-- = ++chCount * 2;     //pe_length
            chCount = 0;
        }
        chCount++;
}
```

Although it is assumed that those having ordinary skill in the art of computer programming will fully understand the logic and function of the heretofore listed computer program, a general description of the program is provided to assist the reader.

The program begins with several type definition statements and with the definition of a parsed path structure. The parsed path structure is defined as being comprised of multiple elements, each of which is an array of unicode characters.

The "NameJam" program converts the ASCII pathname first to an unparsed unicode character string and later converts the unparsed string to a parsed path name structure. The NameJam program begins with the definition of various pointers and the allocation of various stack variables. The parsed path name structure will be assembled in a buffer designated pppath. The ASCII path name is loaded in a buffer designated PathName.

Prior to converting the ASCII path name to the unparsed unicode character string, the NameJam program must first determine whether or not the ASCII path name follows the Uniform Naming Convention (UNC). An ASCII path name which does not follow the UNC begins with a drive specifier character followed, respectively, by a colon character, a single backslash character, a prefix character string, another single backslash character, and a file name character string. On the other hand, an ASCII path name which follows the UNC begins with a pair of adjacent backslash characters followed, respectively, by a host name character string, a single backslash character, a shared name character string (which may be only a single character), a single backslash character, a prefix character string (which may include several elements separated by backslash characters), another single backslash character, and a file name character string. It should be noted that each backslash character preceding a path element is considered to be a part of that path element. Examples of both a non-UNC ASCII path name and a UNC ASCII path name are, respectively:

C:\WINDOWS\SYS\FILE.EXE    (non-UNC)
    and
\\DENVER\J\WINDOWS\SYS\FILE. EXE    (UNC)

If the ASCII path name follows the UNC, only the portion of the path name after the shared name and beginning with a backslash character is converted to a unicode character string and two dummy characters are placed at the beginning of the string. Alternatively, the conversion is begun two characters to the left of the fourth backslash character (i.e., at the backslash character immediately to the left of the character "J" in the UNC example above) and no dummy characters are placed at the beginning of the string. In either case, the result is the same.

If the ASCII path name does not follow the UNC, it is assumed that the path name begins with a drive specifier, followed by a colon character and a backslash character, respectively. The entire non-UNC path name is converted to a unicode character string.

A character by character conversion of the ASCII path name to unicode is effected, and the buffer designated pppath is sequentially filled with the unicode characters, thus creating an unparsed unicode character string.

After all required character codes of the ASCII path name are converted to unicode values, and the unicode values have been written to the pppath buffer, a null unicode character is appended to the end of the unparsed string.

A first pointer is set on the first unicode character of the unparsed string within buffer pppath. For the non-UNC example listed above, the first character is "C"; for the UNC example listed above, the first character is either the first extra character or the backslash ("\") character immediately preceding the character "J".

The contents of buffer pppath are then scanned and counted in a direction from beginning to end, beginning with the first character in the unparsed string, and stopping on the appended null character. Let us call the total number of characters counted T+1, as this quantity includes the null character.

The second pointer is then shifted one character toward the first character so that it points to the last character in the string that is immediately adjacent the appended null character. The count is adjusted during the shift so that the total number of characters in the unparsed string is determined to be the quantity T. T is doubled to reflect the fact that each unicode character value contains two bytes. Thus, for both the UNC and non-UNC examples above, 2T=46 bytes. The first character position in the pppath buffer (i.e., the "C" for the non-UNC case and the first extra character, or the "\" immediately to the left of the character "J" for the UNC case) replaced with the unicode value for the number 46.

A scanning operation is then performed with a third pointer, beginning with the unicode character pointed at by the second pointer (i.e., the character before the appended null), and in a direction toward the first pointer, stopping on the first backslash character encountered, and counting the number of characters, F, beginning with the character pointed at by the second pointer and ending with the first backslash character on which the third pointer stopped. For both the non-UNC and the UNC cases, the file name length F in unicode characters is equal 9. Thus the file name has a byte length of 2F, or 18 bytes. The backslash character to which the third pointer still points is replaced with the unicode value for the number 18.

A number P is determined, which represents the length, in bytes, of the prefix. P is calculated by subtracting 2F from 2T, or F from T and doubling the result. For both the UNC and non-UNC cases shown above, P=28 bytes. The second unicode character in the buffer (e.g., the colon for the non-UNC case and the second extra character or the character "J" for the UNC case are each replaced with the unicode value for the number 28.

The scanning and counting process is repeated, each time moving in a direction toward the first pointer to the next backslash character, counting the number of characters in that string element, multiplying the number of characters by 2 to obtain the string element byte length, and replacing the backslash character immediately preceding each element with a unicode character which specifies the length of the element in bytes. For example, the backslash character immediately preceding the element "SYS" for both UNC and non-UNC strings is replaced with the unicode value for the number 8, which is the byte length of that element including the initial backslash, and the backslash character immediately preceding the element "WINDOWS" for both UNC and non-UNC strings is replaced with the unicode value for the number 16.

At this stage of the process, the unparsed unicode string in buffer pppath has been completely converted to a parsed path name structure.

Figure 2:
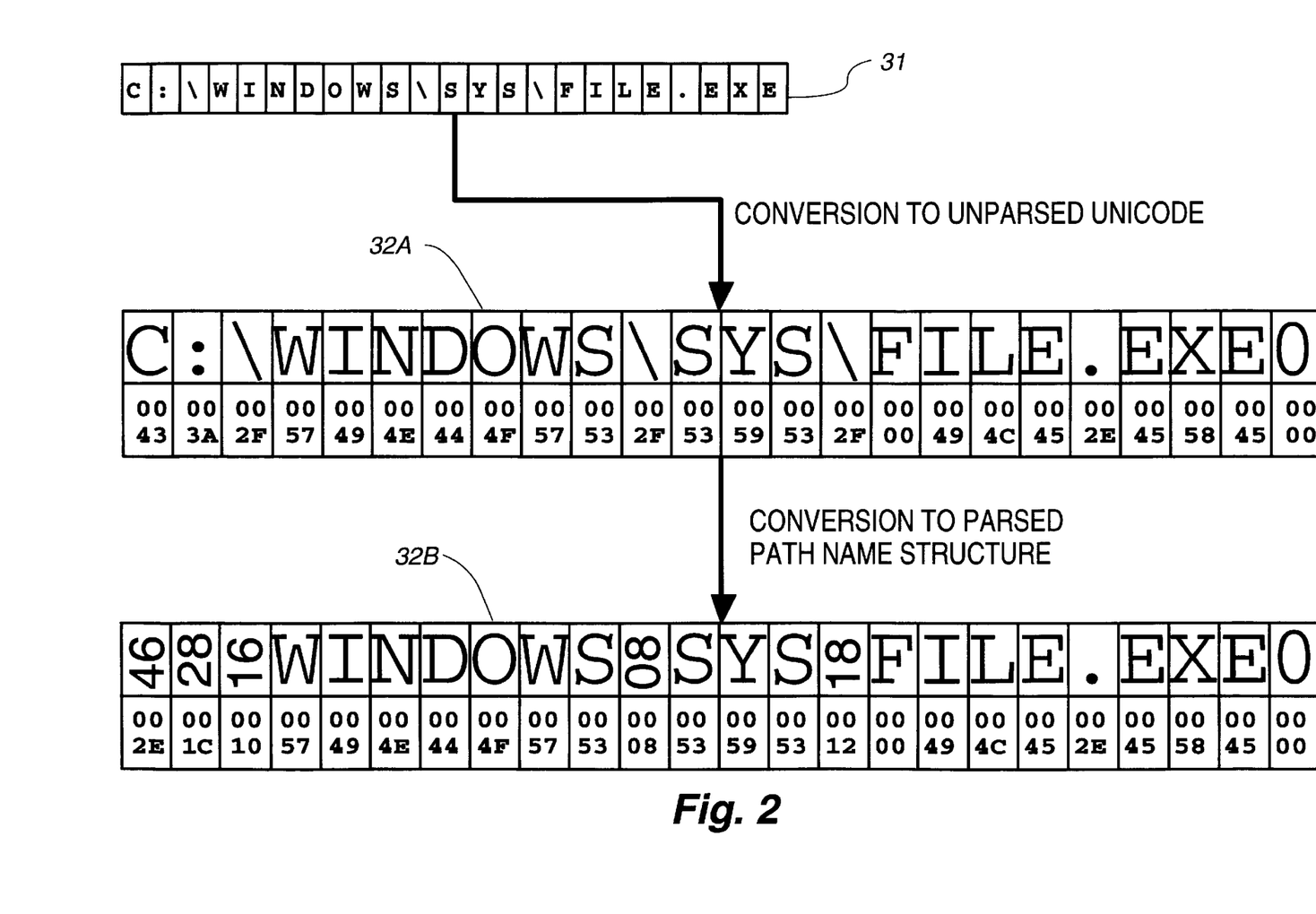
FIG. 2 is a flow chart depicting buffer contents at various stages during the conversion of a non-UNC ASCII path name to a parsed path name structure.

The flow chart of FIG. 2 depicts the contents of the PathName buffer and the pppath buffer at various stages during the conversion of a non-UNC ASCII path name to a parsed path name structure. The non-UNC ASCII path name is first loaded into the PathName buffer 31. Although the contents of PathName buffer 31 are depicted by characters, each byte-wide memory location within the PathName buffer 31 actually contains the binary ASCII code which represents the character. For example, the character "C" would be represented by the binary code "01100111" which is expressed in hexadecimal notation as "67".

Still referring to FIG. 2, for a non-UNC name, the entire path name is converted character-by-character to two-byte-wide unicode and sequentially loaded into the pppath buffer 32A as an un-parsed unicode character string. A null character, represented by sixteen zeros or "00 00" in hexidecimal code, is appended to the unparsed unicode character string.

Still referring to FIG. 2, the unparsed character string is then converted to a parsed path name structure, which is depicted by pppath buffer 32B (the same buffer as 32A, but with different contents) by converting the code for the first character (the letter "C") to a unicode numerical value which represents the length of the unicode character string, minus the null character, in bytes. Thus, the unicode value for "C" is replaced by the unicode value for 46 (the string length in bytes), which is represented by "00 2E" in hexidecimal notation. The unicode value for the colon character, "00 3A" is replaced by the unicode value for 28 (the length of the prefix in bytes), which is represented by "00 1C" in hexidecimal notation. The prefix, of course, comprises every character of the string from "C" to the third "S". The unicode value for each backslash character ("\") is replaced by the unicode value which corresponds to the length, in bytes, of the immediately following path element. That is to say, the first "00 2F" is replaced by "00 10", which represents the byte length of the unicode element "\WINDOWS"; the second "00 2F" is replaced by "00 08", which represents the byte length of the unicode element "\SYS"; and the third "00 2F" is replaced by "00 12", which represents the byte length of the unicode element "\FILE.EXE".

Figure 3:
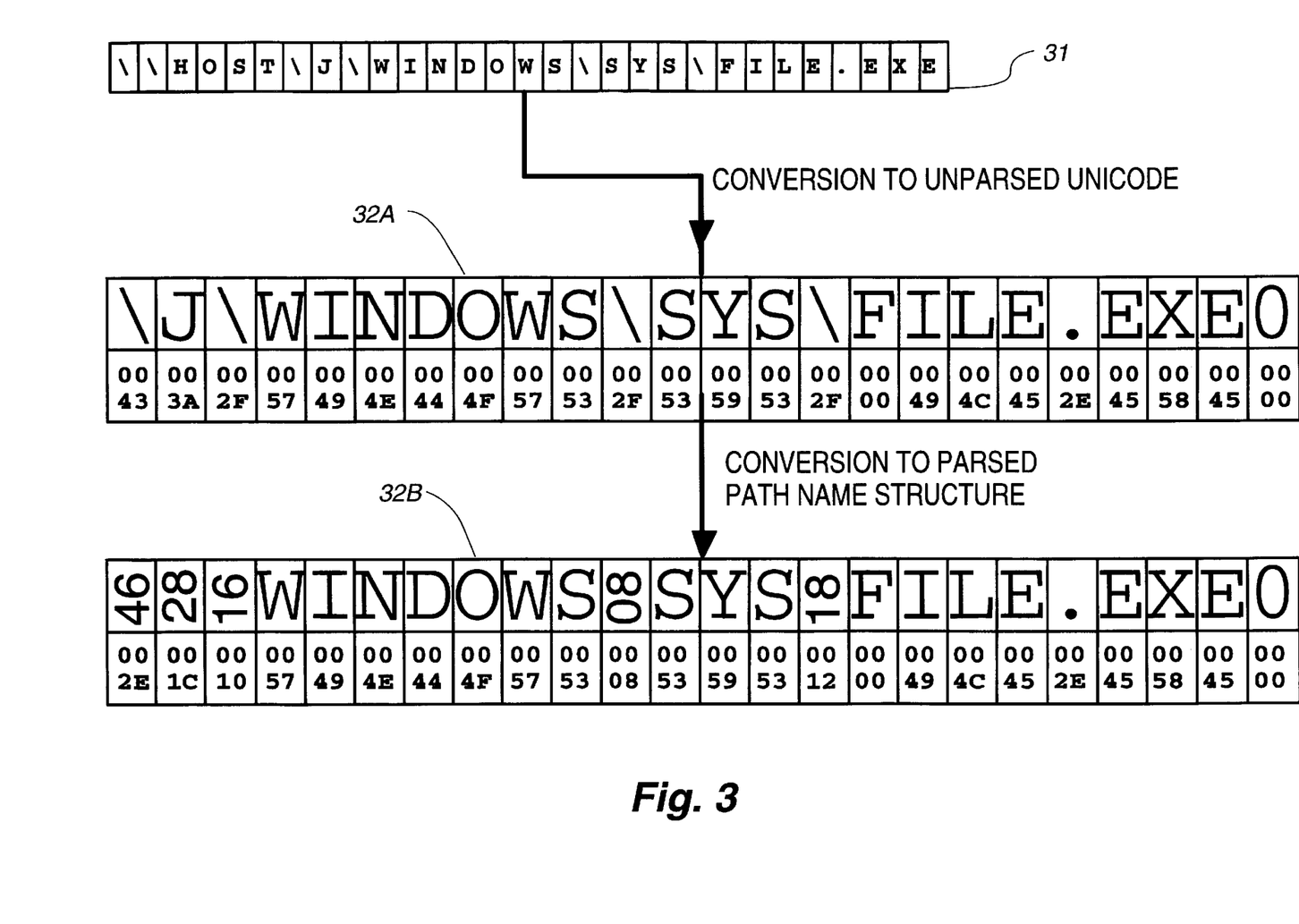
FIG. 3 is a flow chart depicting buffer contents at various stages during the conversion of a UNC ASCII path name to a parsed path name structure.

Conversion of a UNC ASCII path name to a parsed path name structure proceeds by a slightly different process than that for non-UNC ASCII path names. The flow chart of FIG. 3 depicts the contents of the PathName buffer and the pppath buffer at various stages during the conversion of a UNC ASCII path name to a parsed path name structure. The entire UNC ASCII path name is first loaded into the PathName buffer 31. It will be remembered that a UNC ASCII path name begins with two adjacent backslash characters. Thus, when the ASCII path name is scanned, the program identifies such a path name as a UNC path name. Those which begin with a single backslash are assumed to begin with a drive identifier, which is followed by a colon, the prefix and the file name. As in FIG. 2, although the contents of PathName buffer 31 are depicted by characters, each byte-wide memory location within the PathName buffer 31 actually contains the binary ASCII code which represents the character.

Still referring to FIG. 3, for a UNC name, the portion of the path name to the left of the second character to the left of the prefix is discarded during the conversion of the ASCII path name character codes to unicode. The pppath buffer 32A contains the balance of the path name string, as converted to unicode. Conversion to the final parsed path name structure is effected in a manner identical to that employed for a non-UNC ASCII path name. The result is shown in pppath buffer 32B (the same buffer as buffer 32A, but with different contents).

While the invention has been particularly shown and described with reference to a preferred embodiment thereof, it will be understood by those skilled in the art that various other changes in the form and details may be made therein without departing from the spirit and scope of the invention. For example, various techniques and sequences may be employed to count characters, determine element lengths, and substitute element length numbers for backslash characters, blank space characters and other characters at the beginning of the prefix.

What is claimed is:

1. A method encoded in the form of binary program instructions for converting an ASCII path name having a prefix and a file name to a parsed path name structure, said method implemented in conjunction with a computing system, said computing system having a random access memory for storing the program instructions, for providing buffers in which to store data to be manipulated in accordance with the program instructions, as well as intermediate and final program results, and a central processing unit (CPU) for manipulating the data in accordance with the program instructions in order to achieve the intermediate and final program results, said method comprising the steps of:

(a) providing for assigning a buffer within the random access memory in which the parsed path name structure will be assembled;

(b) providing for converting at least a portion of the ASCII path name to an unparsed string of corresponding unicode values, and sequentially writing said unparsed string, character by character, into said buffer; and (c) providing for converting the unparsed string to the parsed path name structure.

2. A method encoded in the form of binary program instructions for converting an ASCII path name having a prefix and a file name to a parsed path name structure, said method implemented in conjunction with a computing system, said computing system having a random access memory for storing the program instructions, for providing buffers in which to store data to be manipulated in accordance with the program instructions, as well as intermediate and final program results, and a central processing unit (CPU) for manipulating the data in accordance with the program instructions in order to achieve the intermediate and final program results, said method comprising the steps of:

(a) providing for assigning a buffer within the random access memory in which the parsed path name structure will be assembled;
(b) providing for converting at least a portion of the ASCII path name to an unparsed string of corresponding unicode values, and sequentially writing said unparsed string, character by character, into said buffer;
(c) providing for converting the unparsed string to the parsed path name structure; and
(d) providing for determining whether or not the ASCII path name follows a Uniform Naming Convention (UNC);
an ASCII path name which does not follow said UNC beginning with a drive specifier character followed, respectively, by a colon character, a prefix beginning with a single backslash character, and a file name beginning with another single backslash character;
an ASCII path name which follows said UNC beginning with a pair of adjacent backslash characters followed, respectively, by a host name, a shared name which begins with a single backslash character, a prefix which begins with another single backslash character, and a file name which begins with still another single backslash character.

3. The method of claim 2, wherein:
for ASCII path names which do not follow said UNC, each character of the ASCII path name is converted to the unparsed string of unicode values; and
wherein, for ASCII path names which follow said UNC, two extra unicode values are written at the beginning of the buffer, and only the prefix and the file name are converted to a string of unicode values which are placed immediately adjacent said two extra values, and wherein said two extra values and the values corresponding to said prefix and said file name comprise the unparsed string of unicode values.

4. The method of claim 3, wherein conversion of the unparsed string of unicode values to a parsed path name structure comprises the steps of:
(a) providing for determining a number T, which represents a total number of unicode character values in said string beginning with a first character of said string and ending with a unicode value which represents a last character of the file name;
(b) providing for replacing said first unicode value of said string with a unicode value equivalent to 2T, which will specify a length for said parsed path name structure in bytes;
(c) providing for determining a number P, which represents a total number of unicode values which represent said prefix;
(d) providing for replacing a second unicode value of the unparsed string with a unicode value equivalent to 2P, which specifies a length for said prefix in bytes.

5. The method of claim 4, which further comprises the step of providing for determining the length of all unicode array elements of which said prefix is comprised and replacing a backslash character which begins each array element within said prefix with a unicode value which specifies a length for that element.

6. The method of claim 2, wherein:
for ASCII path names which do not follow said UNC, each character of the ASCII path name is converted to the unparsed string of unicode values; and
wherein, for ASCII path names which follow said UNC, only two characters preceding the prefix, the prefix, and the file name are converted to the unparsed string of unicode values.

7. The method of claim 6, wherein conversion of the unparsed string of unicode values to a parsed path name structure comprises the steps of:
(a) providing for determining a number T, which represents a total number of unicode character values in said string beginning with a first character of said string and ending with a unicode value which represents a last character of the file name;
(b) providing for replacing said first unicode value of said string with a unicode value equivalent to 2T, which will specify a length for said parsed path name structure in bytes;
(c) providing for determining a number P, which represents a total number of unicode values which represent said prefix;
(d) providing for replacing a second unicode value of the unparsed string with a unicode value equivalent to 2P, which specifies a length for said prefix in bytes.

8. The method of claim 6, which further comprises the step of providing for determining the length of all unicode array elements of which said prefix is comprised and replacing a backslash character which begins each array element within said prefix with a unicode value which specifies a length for that element.

9. A computer program storage medium encoding a program of instructions for a process which converts an ASCII path name, said ASCII path name having both a prefix and a file name, said prefix comprising at least one name element, to a parsed path name structure, said instructions being readable and executable by a computer system, said process comprising the steps of:
(a) providing for loading a first buffer with an ASCII path name;
(b) providing for determining whether or not said ASCII path name conforms to a Uniform Naming Convention (UNC), a UNC path name having a shared name preceding said prefix, a host name preceding said shared name, and a pair of backslash characters preceding said host name, for a non-UNC path name, said prefix being preceded by a colon character, said colon character being preceded by a drive specifier character;
(c) providing for establishing a second buffer within which a parsed path name structure corresponding to the ASCII path name will be assembled;
(d) providing for sequentially scanning the ASCII path name, character code value by character code value, beginning with either the first code value of a non-UNC ASCII path name, or a second code value immediately preceding the prefix of a UNC name;
(e) providing for converting each character code value of the ASCII path name as it is scanned to a unicode value;
(f) providing for sequentially writing each unicode value to memory locations within said second buffer as the conversion proceeds to create an unparsed string of unicode values having first and last unicode values;
(h) providing for writing a null unicode value to the second buffer immediately following said last unicode value of the unparsed string;
(i) providing for pointing to said first unicode value of said unparsed string with a first pointer, said first unicode character being a unicode value farthest from unicode characters corresponding to said file name;
(j) providing for scanning said second buffer with a second pointer in a direction from the first pointer toward the null character, stopping when the pointer is set to the null character, counting the total number, T+1, of unicode values within the unparsed string, including the null character;

(k) providing for moving said second pointer toward said first pointer one unicode value, so that said second pointer points at a unicode value corresponding the last character of said file name, subtracting "1", which represents this one character pointer shift, from the number T+1, and multiplying the result by 2;

(1) providing for scanning said unicode string with a third pointer beginning with the unicode value pointed at by the second pointer and in a direction toward said first pointer, stopping said third pointer on a first backslash unicode value, and counting a number of characters, F, including said first backslash unicode value;

(m) providing for determining a number, P, which represents a length, in bytes, of said prefix, by subtracting F from T and multiplying the result by 2;

(n) providing for replacing said first backslash unicode value with a unicode value equivalent to the number F;

(o) providing for repeatedly scanning with said third pointer toward said first pointer until encountering each intervening backslash unicode value, replacing each encountered backslash unicode value with a unicode value corresponding to a quantity of unicode values counted since the previous backslash, and multiplying the result by "2";

(p) providing for replacing said first unicode value with a unicode value equivalent to the number 2T; and (q) providing for replacing a unicode value at a second memory position with said second buffer, said second position being adjacent said first unicode value, with a unicode value equivalent to the number 2P.

10. A computer implemented process for converting an ASCII path name to a parsed path name structure, said ASCII path name having a filename and prefix, said prefix comprising at least one path element, said process comprising the steps of:

(a) providing for loading a first buffer with an ASCII name;

(b) providing for determining whether or not said ASCII path name conforms to a Uniform Naming Convention (UNC), a UNC path name having a shared name preceding said prefix, a host name preceding said shared name, and a pair of backslash characters preceding said host name, for a non-UNC path name, said prefix being preceded by a colon character, said colon character being preceded by a drive specifier character;

(c) providing for establishing a second buffer within which a parsed path name structure corresponding to said ASCII path name will be assembled;

(d) providing for sequentially scanning the ASCII path name character by character, beginning with a first character of said ASCII path name if a non-UNC name and beginning with two characters preceding said prefix if a UNC name;

(e) providing for converting each character of said ASCII path name as it is scanned to a unicode value;

(f) providing for sequentially writing each unicode value to said second buffer as the conversion proceeds, thus creating an unparsed string of unicode values, said unparsed string having first, second, and last unicode values, as well as intervening unicode values between said second and last unicode values, said first unicode value being most distant from said file name;

(g) providing for appending a null unicode character value to said second buffer immediately following said last unicode value;

(h) providing for determining a quantity 2T equivalent to the total, in bytes, of said unicode character string, and replacing said first unicode value with another unicode value corresponding to the quantity 2T;

(i) providing for determining a quantity 2P equivalent to a length of said prefix in bytes, and replacing said second unicode value with yet another unicode value corresponding to the quantity 2P; and (j) providing for determining a quantity 2F corresponding to a length, in bytes, of the unicode characters corresponding to said file name, and replacing a unicode value corresponding to a backslash character at the beginning of said file name with a unicode value corresponding to 2F; and (k) providing for determining a unicode value corresponding to a length, in bytes, for any sub element of said prefix and replacing a unicode value corresponding to a backslash character at the beginning of such element with a unicode value corresponding to the length of such element.

11. The method of claim 9, wherein total unicode string length T is determined by the steps of:

(a) providing for pointing to said first unicode value with a first pointer;

(b) providing for scanning said unparsed string with a second pointer in a direction from said first unicode value to said null character value, counting a total number, T+1, of unicode characters, including the null character;

(c) providing for moving said second pointer toward the first pointer one unicode value, so that said second pointer points at said last unicode value, subtracting "1", which represents this one character move, from T+1, and doubling the result.

12. The method of claim 9, wherein prefix length 2P, in bytes is determined by the steps of:

(a) providing for scanning with a third pointer beginning with a unicode value pointed at by said second pointer and in a direction toward said first pointer, stopping said third pointer on a unicode value corresponding to a first backslash character encountered, and counting a number of characters, F, including said first backslash character; and (b) providing for calculating the quantity, 2P, which represents prefix length in bytes, by subtracting F from T and doubling the result.

13. A computer implemented method for converting an ASCII path name to a parsed path name structure, said ASCII path name having file name and prefix elements, said prefix element having at least one sub element, said process comprising the steps of:

(a) providing for defining a parsed path structure;

(b) providing for allocating buffers for stack variables;

(c) providing for creating a plurality of pointers for scanning and counting functions;

(d) providing for determining whether or not Uniform Naming Convention is used for the ASCII path name;

(e) providing for converting the ASCII code to an unparsed string of unicode values, and writing the unparsed string to a buffer;

(f) providing for employing the scanning and counting functions, in addition to mathematical and replacement functions to convert a first pair of buffer locations to unicode values which are indicative of total string length and prefix length, respectively, and to convert each unicode value corresponding to a backslash character within said unicode string to a specific unicode values, each of which identifies a length, in bytes, associated with a path element which began with the replaced backslash character unicode value.

14. A computer program product comprising:

a computer usable medium having computer readable code embodied therein for converting an ASCII path name to a parsed path name structure, the computer program product comprising:

computer readable program code devices configured to cause a computer to effect defining a parsed path structure;

computer readable program code devices configured to cause a computer to effect allocating buffers for stack variables;

computer readable program code devices configured to cause a computer to effect creating a plurality of pointers for scanning and counting functions;

computer readable program code devices configured to cause a computer to effect determining whether or not Uniform Naming Convention is used for the ASCII path name;

computer readable program code devices configured to cause a computer to effect converting the ASCII code to an unparsed unicode string having first, second, last and intervening unicode values, and writing said unparsed string to a buffer; and computer readable program code devices configured to cause a computer to effect employing the scanning and counting functions, in addition to mathematical and replacement functions to convert said first and second unicode values to new unicode values which are indicative of total string length and prefix length, respectively, and to convert each unicode value corresponding to a backslash character within said unicode string to a specific unicode values, each of which identifies a length, in bytes, associated with a path element which began with the replaced backslash character unicode value.

15. A computer program product comprising:

a computer usable medium having computer readable code embodied therein for converting an ASCII path name to a parsed path name structure, the computer program product comprising:

(a) computer readable program code devices configured to cause a computer to effect providing the assignment of a buffer within a random access memory in which the parsed path name structure will be assembled;

(b) computer readable program code devices configured to cause a computer to effect providing for converting at least a portion of the ASCII path name to an unparsed string of unicode values, and sequentially writing said unparsed string, character by character, into said buffer; and (c) computer readable program code devices configured to cause a computer to effect providing for converting said unparsed string to the parsed path name structure.

16. The computer program product of claim 14, which further comprises computer readable program code devices configured to cause a computer to effect providing for defining a parsed path name structure as a unicode character string having a defined format.

17. A method encoded in the form of binary program instructions for converting an ASCII path name having a prefix and a file name to a parsed path name structure, said method implemented in conjunction with a computing system, said computing system having a random access memory for storing the program instructions, for providing buffers in which to store data to be manipulated in accordance with the program instructions, as well as intermediate and final program results, and a central processing unit (CPU) for manipulating the data in accordance with the program instructions in order to achieve the intermediate and final program results, said method comprising the steps of:

(a) providing for assigning a buffer within the random access memory in which the parsed path name structure will be assembled;

(b) providing for converting at least a portion of the ASCII path name to an unparsed string of corresponding unicode values, and sequentially writing said unparsed string, character by character, into said buffer;

(c) providing for converting the unparsed string to the parsed path name structure; and (d) providing for defining a parsed path name structure as a string of unicode values, said string having a first unicode value which represents a first number which specifies a length, in bytes, of said string, said string having a first array of unicode values which represent said prefix, said first array being followed by a second array of unicode values which represent the file name, said first unicode value being followed by a second unicode value which represents a second number which specifies a length, in bytes, of said prefix plus four bytes which account for said first and second unicode values, said second unicode value being followed by a third unicode value which represents a number which specifies a length, in bytes, of a first element of said prefix, any other element of said prefix and said file name each being preceded by a corresponding byte length specifying unicode value.

* * * * *